United States Patent [19]

Klatt et al.

[11] 4,389,239

[45] Jun. 21, 1983

[54] METHOD AND PRESSURE CONTAINER FOR PRODUCING HYDROGEN-STORAGE METAL GRANULATES

[75] Inventors: Karl-Heinz Klatt, Jülich; Siegfried Pietz, Dortmund; Helmut Wenzl, Jülich, all of Fed. Rep. of Germany

[73] Assignee: Kernforschungsanlage Jülich GmbH, Jülich, Fed. Rep. of Germany

[21] Appl. No.: 272,055

[22] Filed: Jun. 9, 1981

[30] Foreign Application Priority Data

Jun. 18, 1980 [DE] Fed. Rep. of Germany ....... 3022708

[51] Int. Cl.³ .............................................. B22F 9/00
[52] U.S. Cl. .................................. 75/0.5 R; 206/0.7; 53/408; 423/644; 423/648 R
[58] Field of Search ................... 423/644, 645, 648 R; 75/0.5 R, 0.5 B, 0.5 BA; 34/15; 62/48

[56] References Cited

U.S. PATENT DOCUMENTS

| | | | |
|---|---|---|---|
| 4,134,490 | 1/1979 | Turillon et al. | 206/0.7 |
| 4,200,623 | 4/1980 | Muller et al. | 423/644 |
| 4,200,624 | 4/1980 | Muller et al. | 423/644 |
| 4,300,946 | 11/1981 | Simons | 75/0.5 B |

OTHER PUBLICATIONS

H. Wenzl, "Metall-Wasserstoffkristalle in Festkörperforschung und Energietechnik", published in Annual Report, "Jahresbericht der Kernforschungsanlage Jü lich, GmbH, 1976/1977 and also German Utility Model 76 05 258.
J. J. Reilly et al., in "Formation and Properties of Iron Titanium Hydride", Inorganic Chemistry, 1974, p. 218 ff.

*Primary Examiner*—L. Dewayne Rutledge
*Assistant Examiner*—Christopher W. Brody
*Attorney, Agent, or Firm*—Frishauf, Holtz, Goodman & Woodward

[57] ABSTRACT

The activation of a mass of metal granules capable of storing hydrogen with the formation of hydride in a pressure vessel, instead of having to be activated before use by repeated heating in a hydrogen atmosphere followed by cooling and evacuation before the next heating, is activated in the pressure vessel used for storage by first heating a small portion of the granulate to the necessary activation temperature and then allowing the heat developed by the activation of that portion to produce the activation of the remainder of the granulate. It is found that it thus possible to provide complete activation with only one heating step. The small portion that is first activated may be a part of the granulate that is of a different composition that is easier to activate, for example, LaNi₅, which can be activated at room temperature, or iron-titanium alloys that are capable of activation under 100° C. Alternatively, the entire mass of granulate may be selected for its hydrogen-storage capability rather than its ease of activation and a small part thereof can be activated first by means of a high temperature (up to 800° C.) generated in a very small source of heat, as by a platinum wire electric heater, turned on for only 10 or 20 minutes, after which the activation produced provides enough heat for activating the remainder of the granular material.

11 Claims, 7 Drawing Figures

| SAMPLE AND DATE | ALLOY COMPOSITION IN ATOMIC % | | | | | | ACTIVATION INITIATING | HYDROGEN CONC. ATTAINED* |
|---|---|---|---|---|---|---|---|---|
| | Ti | Fe | Mn | $O_2$ | C | Al | TEMP IN °C | $C = \dfrac{H \text{ ATOMS}}{Me \text{ ATOMS}} \times 100\%$ |
| G+E OF OCT. 1976 | ~50 | ~50 | -- | ~0.2 | RESIDUAL IMPURITIES UNKNOWN | | 90 | 82 |
| G+E OF SEPT. 9, 1977 | 51.8 | 43.8 | 1.86 | 1.12 | 0.04g | 1.3 | 50 | 91 |
| G+E OF AUG. 12, 1977 | 50.5 | 47.1 | 1.87 | 0.11 | 0.31 | <0.01 | 80 | 90 |
| I.F.F. OF APR. 20, 1979 | ~50 | ~50 | -- | <0.01 | <0.01 | -- | 150 | 50 |

\* AFTER ONCE HEATING TO ACTIVATION TEMP. AT 64-65 BARS

FIG. 7

METHOD AND PRESSURE CONTAINER FOR PRODUCING HYDROGEN-STORAGE METAL GRANULATES

This invention concerns a method of producing a metal granulate suitable for the storage of hydrogen by treating a previously evacuated metal granulate with hydrogen at elevated temperature and also a pressure vessel for carrying out the process.

Metal granulates suitable for storage of hydrogen are known. The hydrogen is incorporated into the metals in interstitial locations in the crystal lattice with the formation of metal hydride. Metal granulates having high storage capacity are of interest for practical application. Fe-Ti alloys have been found particularly suitable (compare H. Wenzl, "Metall-Wasserstoffkristalle in Festkörperforschung und Energietechnik", published in the annual report known as "Jahresbericht der Kernforschungsanlage Jülich", GmbH for 1976/77 and also German Utility Model 76 05 258).

In order to make the metal granulate capable of picking up hydrogen, it is necessary to produce metallic surfaces that have no oxide layers or other impurities which interfere with hydrogen permeation. For increasing the capability of taking up hydrogen, furthermore, a high specific surface per unit of volume of granulate is sought.

For this purpose, a treatment for "activation" of the metal granulate precedes the use of metal granulates as storage material. In such treatments, the metal granulate is first evacuated and then provided with hydrogen gas at a raised temperature. It is known to introduce the hydrogen into the metal granulate under pressure at a temperature between 200° and 500° C. The metal granulate is exposed to the hydrogen atmosphere for several hours. In order to obtain a high storage capability, this treatment is repeated several times, with the metal granulate being cooled down to room temperature and, at the same time, evacuated before renewed treatment with hydrogen gas. Such a pre-treatment of the metal granulate is described, for example, by J. J. Reilly et al, in "Formation and Properties of Iron Titanium Hydride", Inorganic Chemistry, 1974, pp. 218 ff, in U.S. Pat. No. 4,079,523 and in German published patent application (OS) 28 11 875.4.

The activation process for the metal granulate often requires several days because of the many operations involved. Furthermore, the activation of the metal granulate in the storage container itself makes it necessary to heat up and cool down the storage container along with the granulate. This limits the use of metal granulate for hydrogen storage to storage containers of small volume, which are readily capable of being heated. The much desired practical introduction of large containers is thereby made very difficult.

THE INVENTION

It is an object of this invention to provide a method for producing a metal granulate having a capability for the storage of hydrogen that makes possible an activation of the granulate with small expenditure of energy. At the same time, it is a further object to reduce the treatment time needed for the activation.

Briefly, when the hydrogen is introduced into the granulate under pressure, a part of the metal granulate is heated to a temperature suitable for taking up hydrogen. It is necessary to heat up only a part of the granulate to such a temperature. In an advantageous manner, the exothermic heat effect taking place in the taking up of hydrogen is utilized for the activation. The heat thus liberated is transferred from the part of the granulate taking up hydrogen to neighboring metal granulate particles, which are thereby heated and on their part made capable of picking up hydrogen and then giving off more heat. It has been found with some surprise that in this manner the entire metal granulate quantity, beginning with an activated central portion, fully activates itself, and high storage capacities are obtained in a single process step. The heating up temperature necessary for taking up hydrogen for the first part of the metal granulate to be activated can be empirically determined. It depends upon the particular alloy to be activated, of which the metal granulate consists, and only slightly on the hydrogen pressure under which the hydrogen charging is carried out.

The taking up of hydrogen can be accelerated by soaking the granulate with heat under vacuum before introducing hydrogen. For this baking out of the granulate, temperatures between 100° and 200° C. are sufficient. Such a heating of the metal granulate can, for example, be obtained with a heat transfer medium that flows through a heat exchange apparatus inserted in the granulate.

For activation of the first part of the metal granulate to be activated, it has been found advantageous to use an easily activated metal granulate as the initiator for the process-generated heating, the easily activatable granulate being mixed into the metal granulate to be activated. If hydrogen is introduced into such a metal granulate mixture composed of easily activatable and more difficultly activatable materials mixed together, at first hydrogen is picked up by the easily activatable metal granulate and, as the result of the exothermic reaction, heat is given off to the more difficultly activatable granulate. The heating up promotes the hydrogen pick-up capability of the difficultly activatable metal granulate, so that with further development of heat the entire metal granulate quantity itself is activated. As initiator for activation, easily activatable metal granulates with high heat generation are particularly suitable. $LaNi_5$ or FeTi alloys that are activatable below 100° C. are preferably incorporated in the mixture for activation initiation. Less than 5% by weight of the easily activatable granule is amply sufficient for service as an activation initiator.

As a further development of the invention, the portion of the granulate that is first activated in the process of the invention is a portion that is heated up by electrical heating to a temperature suitable for taking up hydrogen. For the simplest implementation of this development of the invention, an electrical heating resistance is inserted in the vessel where it is surrounded by the portion of the granulate to be heated by it. The metal granulate that is located in the region of the heater is quickly heated up to a temperature suitable for taking up hydrogen. The permeation and diffusion of hydrogen into this part of the granulate, which then takes place, causes heating up of the remaining portion of the granulate and thus leads progressively to activation of the entire charge of metal granulate in the container. The electric heating can be turned off a short time after the initiation of the activation process, because the metal granulate then activates itself on its own. The warming up of a very small portion of the metal granulate relative to the entire metal granulate amount in the container is sufficient for initiating the activation process. For example, a point source of heat is sufficient.

BRIEF DESCRIPTION OF THE DRAWINGS

The invention is further described by way of example with reference to the annexed drawings, which include a schematic diagram of a container equipped according to the invention and diagrams showing the time course of the activation processes, as follows:

FIG. 7 is a table showing activation temperatures of metal granulates of various Fe-Ti-Mn alloys.

DESCRIPTION OF THE ILLUSTRATED EMBODIMENTS

Figure 1:
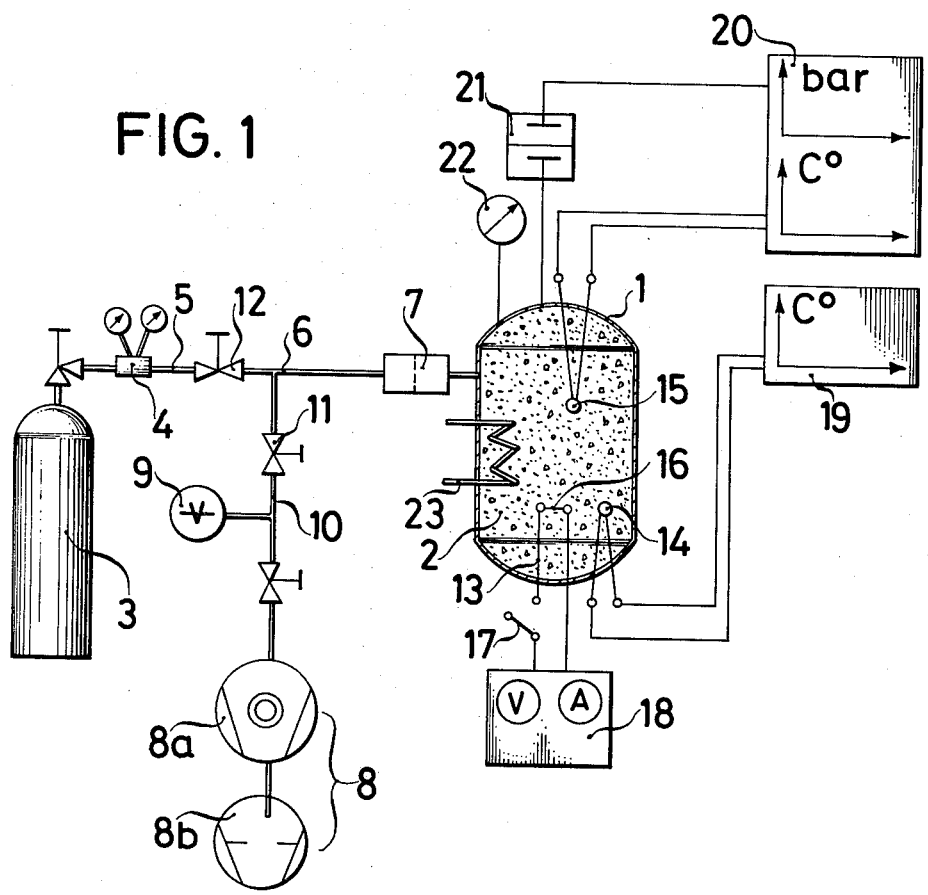
FIG. 1 is a diagram of an installation for activating a metal granulate filling of a pressure vessel in accordance with the invention.

A pressure vessel 1 can be connected into the installation shown in FIG. 1 for activation of a metal granulate 2 of which the pressure vessel is filled. The pressure vessel is made of stainless steel in a construction that is vacuum tight for ultra-high vacuum. The metal granulate forms a loosely laid filling in the container. Hydrogen is introduced into the pressure vessel 1 from a hydrogen bottle 3 of the installation, through a pressure-reducing valve 4 and a connecting line 5. In order to hold back impurities, the hydrogen, before entering the pressure vessel 1, passes through a filter 7 set into a connecting line 6. The connecting line 6 serves at the same time for a connection for a vacuum pump 8 to the pressure vessel. The vacuum pump consists in the illustrated examples of a pump complex comprising a turbomolecular pump 8a and a rotary vane pump 8b, which backs up the turbomolecular pump, following it in the direction of flow of the gas being pumped out. A vacuum-meter 9 serves for measurement of the vacuum produced by the pump combination. The vacuum line 10 and the connection line 6 can be blocked off one from the other by means of a valve 11. A shut-off valve 12 is also provided in the hydrogen supply line 5 ahead of the connection of the vacuum line 10 with the connection line 6.

An electrical heater 13 and thermosensitive elements 14 and 15 are inserted in the metal granulate 2 in the pressure vessel 1. The electrical heater consists of a heating wire 16 that is connected outside the pressure vessel through a switch 17 with a voltage source 18. The thermosensitive element 14 has only a slight spacing, about 5 mm, from the heating wire 16, while the other thermosensitive element 15 is located centrally in the pressure vessel 1 at a distance of about 3 cm from the heating wire. Both thermosensitive elements 14 and 15 are connected with recording indicators 19 and 20. Along with the temperature of the metal granulate, there is recorded in the recording indicator 20 at the same time the pressure in the pressure container in the pressure vessel 1. A pressure-measuring cell 21 and a manometer 22 are provided for measuring the pressure that is produced in the pressure vessel 1. In order to make possible heating of the metal granulate generally, a heat exchanger 23, which is shown only schematically in FIG. 1, is provided in the pressure vessel 1.

For the activation of metal granulate, the pressure vessel 1 is first filled with granulate. If a readily activatable metal granulate is used as an initiator, this is mixed with the metal granulate to be activated, and the mixture is put into the pressure vessel. If that is the case, the electrical heater 13 is not needed for the activation process. After the pressure vessel has been filled with the metal granulate 2, the pressure vessel 1 is evacuated. In the evacuation step, the metal granulate is preferably warmed up to 200° C. by means of the heat exchanger 23 and baked out at that temperature for an hour or two. After cooling down to room temperature and producing of a vacuum in the pressure vessel of about $10^{-6}$ mbar, the vacuum line 10 is shut off and hydrogen is admitted into the pressure vessel 1. The course of the pressure in the pressure vessel 1 and the change with time of the temperature in the metal granulate 2 are observable and recorded at both temperature measurement positions by the respective recording indicators 19 and 20.

If for the initial heating of a part of the metal granulate the electrical heater 13 is used instead of an admixture of a readily activatable material, the switching on time of the electrical heating can also be registered by the thermosensitive element 14.

There follow below examples of activation of Fe-Ti-Mn metal granulates.

EXAMPLE 1

Figure 2:
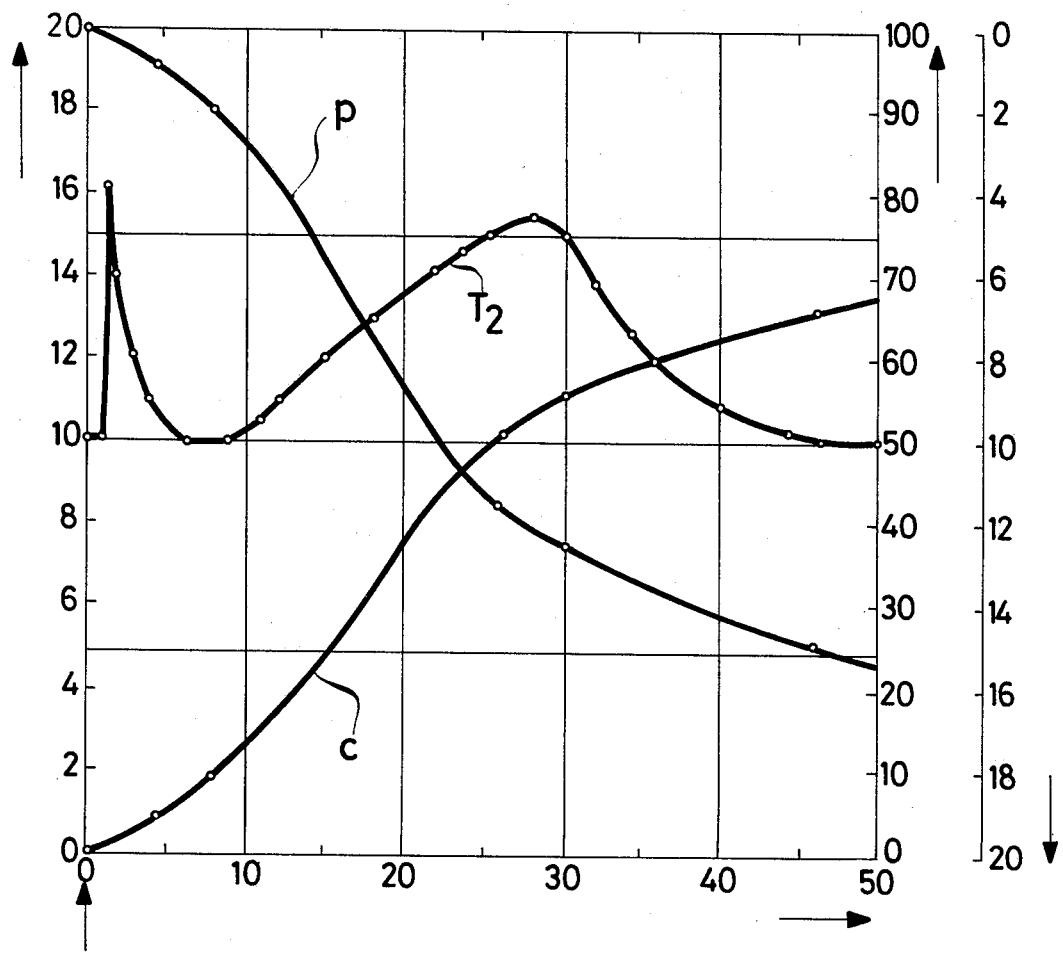
FIG. 2 is an activation diagram in the form of a graph for a metal granulate mixture of granular particles of a Fe-Ti-Mn alloy with granular particles of LaNi$_5$.

An Fe-Ti-Mn alloy having a titanium content of 51.8 atomic %, an iron content of 43.8 atomic %, a manganese content of 1.86 atomic %, as well as 1.3 atomic % of aluminum, 1.12 atomic % of oxygen and 0.04 atomic % of carbon, was mixed with a small proportional quantity of LaNi$_5$. The latter alloy takes up hydrogen up to saturation (circa 100 atom %) without any special pretreatment at a hydrogen pressure of about 3 bar at room temperature. The heat liberated by the taking up of hydrogen amounts to about 31 kJ/mol H$_2$ and corresponds thus to the reaction heat of about 30 kJ/mol H$_2$ produced by the formation of Fe-Ti hydride. 3.5% by weight of LaNi$_5$ granulate, having a grain size smaller than 100 μm, were added to the Fe-Ti-Mn metal granulate above described in the mixing step above mentioned. The metal granulate mixture was used to fill the pressure vessel 1, which was evacuated for 15 hours at room temperature to reach a vacuum of $10^{-6}$ mbar. Then hydrogen was allowed to flow into the pressure vessel until the pressure rose to 50 bar and no longer. Without supplementary heating of the pressure vessel, the temperature in the metal granulate rose about 1 hour after the introduction of the hydrogen. As shown in FIG. 2, another temperature rise could be observed on the recording instruments after about 9 hours. In the activation diagram provided by FIG. 2, the temperature $T_2$ was measured at the thermosensitive element 15 and the pressure p in the pressure vessel was detected by the pressure-measuring cell 21. The temperature $T_2$ and the pressure p were both recorded by the recording indicator 20. From the pressure drop in the pressure vessel 1 during the charging of the metal granulate with hydrogen, the hydrogen concentration c in the metal granulate was calculated. This is given in atomic % in the diagram. After 50 hours, an activation of the metal granulate, up to a hydrogen absorption of 68 atomic %, could be reached. The end concentration of 75 atomic % was established after 60 hours.

EXAMPLE 2

The metal granulate described in Example 1, but without addition of $LaNi_5$ was filled into the pressure vessel and evacuated for about 15 hours to reach a vacuum of $10^{-6}$ mbar. Then hydrogen was introduced into the pressure vessel up to a pressure of 50 bar, with the electrical heater 13 being switched on at the beginning of the hydrogen flow. The heating wire 16 was a platinum wire 2 mm long and having a diameter of 0.4 mm. The temperature in the region of the heating wire 16 was about 800° C.

Figure 3:
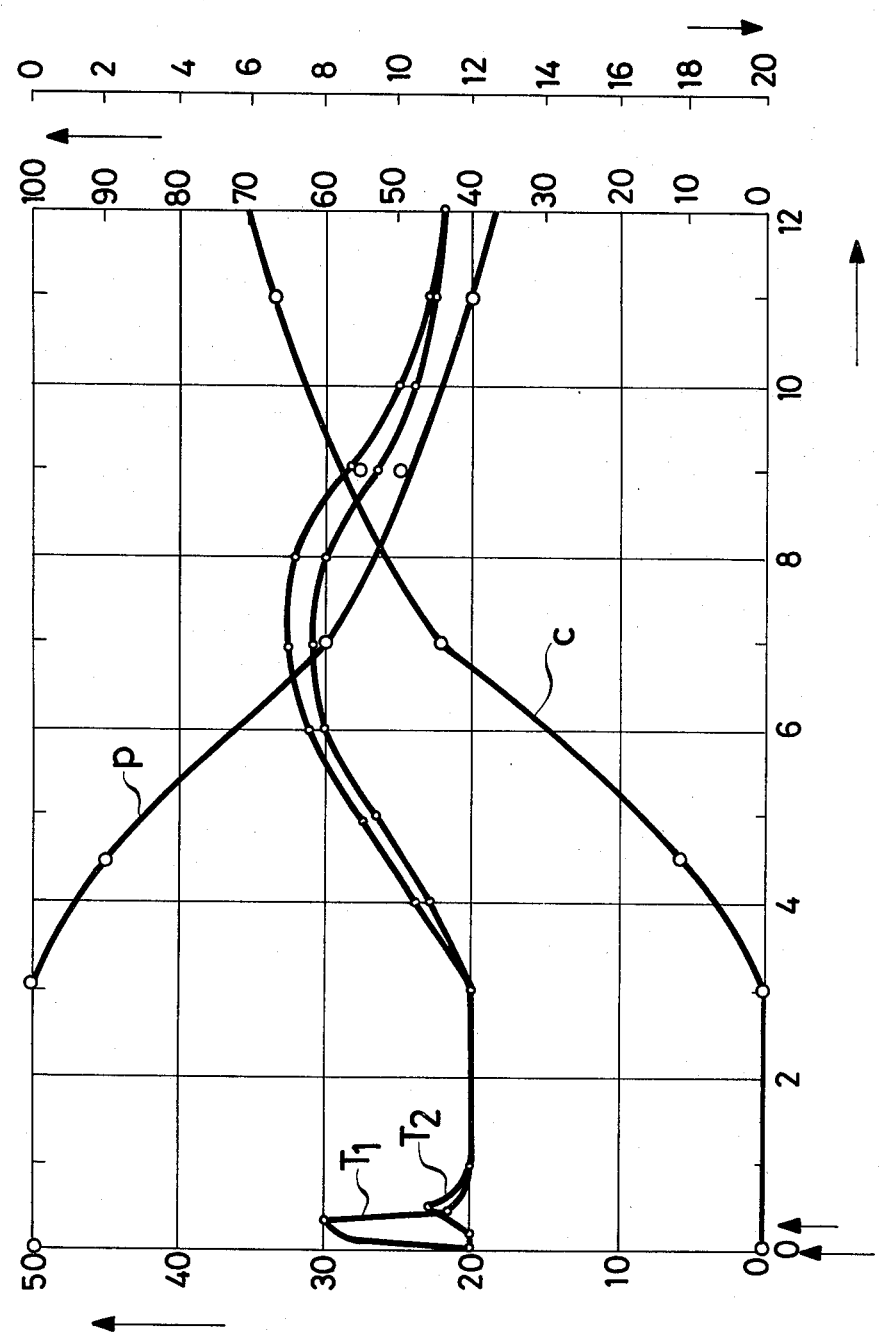
FIG. 3 is an activation diagram in the form of a graph for a granular mass of Fe-Ti-Mn alloy not previously baked out.

The temperature course for $T_1$ and $T_2$ and the course of the pressure p, as well as the hydrogen concentration c in the metal granulate calculated therefrom, are shown in FIG. 3. The temperature $T_2$ represents in the same as in Example 1 the temperature measured by the thermosensitive element 15 in the metal granulate, and the temperature $T_1$ corresponds to the temperature measured by the thermosensitive element 14 in the region of the heating wire 16. The electrical heating energy remains switched-in for 20 minutes.

The portion of the metal granulate heated by the heating wire took up hydrogen, but this was at first unmeasurable, either by the falling off of pressure or by temperature increase in the metal granulate. Only after three hours did the take-up of hydrogen show an effect on hydrogen pressure and on the temperature in the metal granulate. The maximum temperature was measured after a charging time of about 7 hours. After about 15 hours, the hydrogen content in the metal granulate stood at 91±3 atomic %.

EXAMPLE 3

Figure 4:
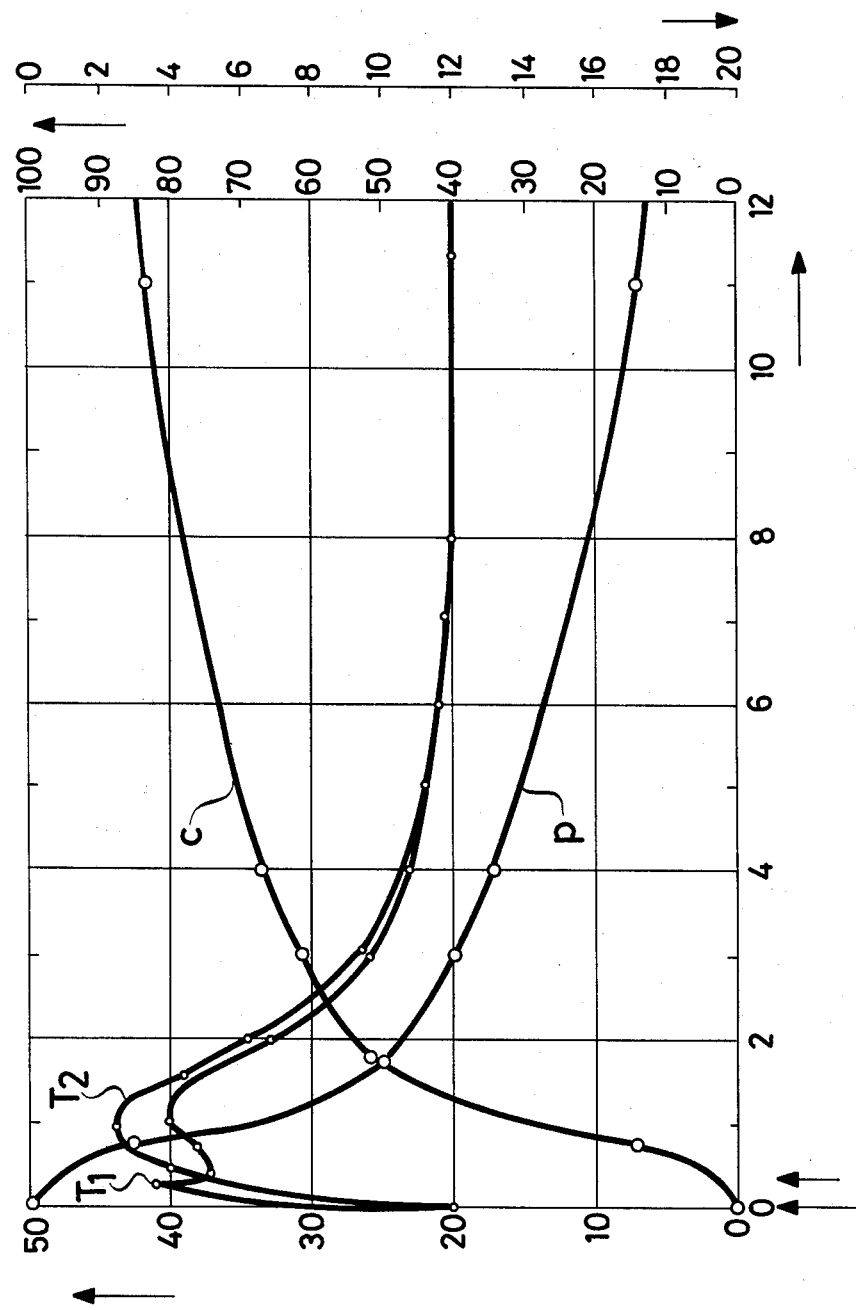
FIG. 4 is an activation diagram in the form of a graph for a baked-out metal granulate of Fe-Ti-Mn alloy for a local activation-initiation heating time in a hydrogen atmosphere of twenty minutes.

A metal granulate of the Fe-Ti-Mn alloy described in Example 1 (without the addition of $LaNi_5$) was baked out at a temperature between 120° and 140° C. during evacuation to $10^{-6}$ mbar during a period that lasted up to 5 hours. After cooling down to room temperature and introduction of hydrogen into the pressure container up to a pressure of 50 bar, the electrical heater was switched in for 20 minutes. The course of pressure and temperature is shown in FIG. 4.

Immediately after the switching in of the heater, the metal granulate markedly took up hydrogen. The temperature $T_2$ in the metal granulate rose steadily, and after about 1 hour reached its maximum value. The switching off of the heater was detectable only at the thermosensitive element 14, as is evident from the course of the temperature $T_1$ at the beginning of the activation process. The hydrogen content in the metal granulate after 15 hours of activation time amounted to 91±3 atomic %.

EXAMPLE 4

A metal granulate of Fe-Ti-Mn alloy, as specified in Example 1, was baked out as described in Example 3.

Figure 5:
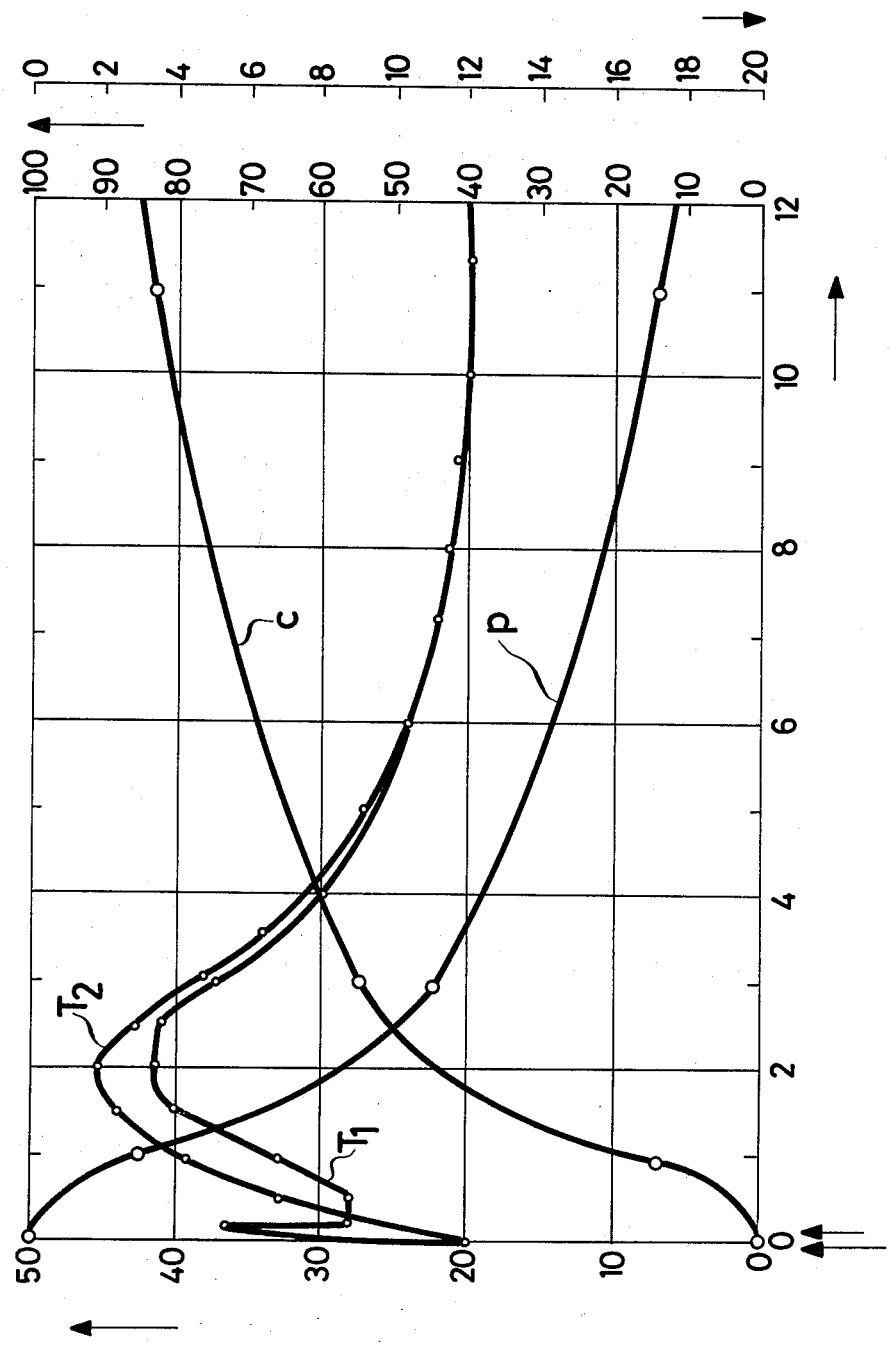
FIG. 5 is an activation diagram in the form of a graph for a baked-out metal granulate of Fe-Ti-Mn alloy for a local activation-initiation heating time in a hydrogen atmosphere of ten minutes.

After introduction of hydrogen into the pressure vessel, up to a pressure of 50 bar, the electrical heating was switched on for 10 minutes. The course of pressure and temperature is given in FIG. 5.

The metal granulate noticeably took up hydrogen directly after switching-in of the heater 13 in the same manner as in Example 3. The temperature $T_2$ in the metal granulate reached its maximum value after approximately 2 hours. The taking up of hydrogen in the metal granulate then fell behind the hydrogen charging reached in Example 3, but after 15 hours of activation time, the metal granulate, even in this case, had reached a hydrogen concentration of 91±3 atomic %.

The metal granulate loaded with hydrogen in this manner was then dehydrided by heating up to about 150° C. and evacuation. Thereafter, hydrogen was again admitted into the pressure vessel 1. The metal granulate heated itself very quickly up to 130° C., and after 7 hours was fully recharged at a hydrogen content of 91±3 atomic %. This shows that the highest activation stage of the metal granulate was already reached with the previously carried out activation process.

EXAMPLE 5

Figure 6:
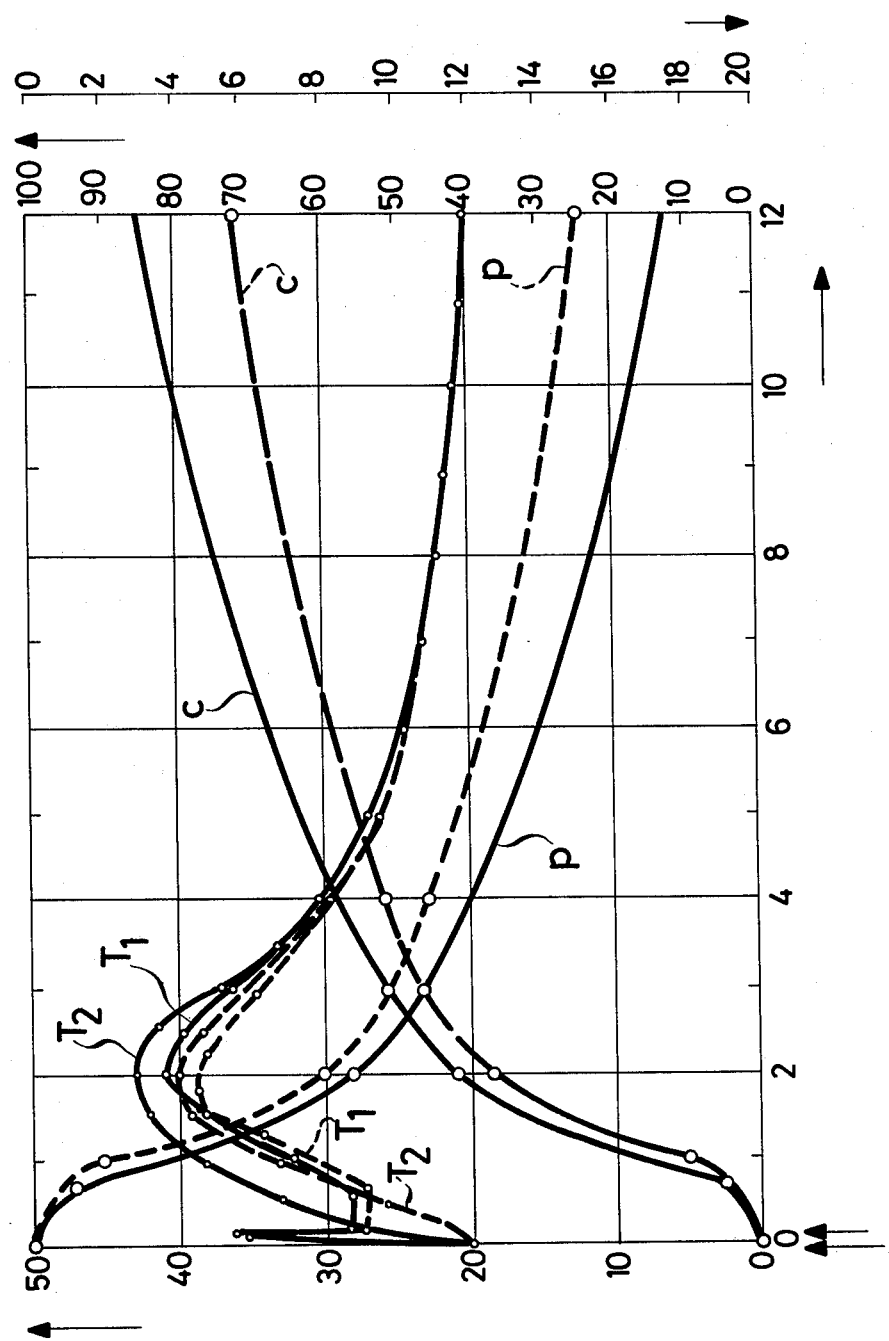
FIG. 6 is an activation diagram in the form of a graph for baked-out metal granulates of other Fe-Ti-Mn alloys, with a local activation-initiation heating time of ten minutes in a hydrogen atmosphere.

An Fe-Ti-Mn metal granulate with a titanium content of 50.5 atomic %, an iron content of 47.1 atomic %, a manganese content of 1.87 atomic %, along with 0.31 atomic % of carbon, 0.11 atomic % of $O_2$ and less than 0.01 atomic % of aluminum was, after filling into the pressure vessel 1, baked out in the temperature range between 120° and 140° C. until a vacuum of $10^{-6}$ mbar was reached, which required 5 hours. After cooling down to room temperature, and introduction of hydrogen into the pressure vessel up to a pressure of 50 bar, the electric heater was switched in for 10 minutes. The courses of temperature and pressure in the metal granulate are shown in FIG. 6. The curves relating to this example are represented in solid lines. After 15 hours, the hydrogen content in the metal granulate stood at 90±3 atomic %.

EXAMPLE 6

An Fe-Ti-Mn metal granulate with a titanium content of about 50 atomic %, an iron content of 45 atomic % and a manganese content of about 5 atomic % was activated as follows. First, a portion of the metal granulate was activated by the now conventional process in several activation cycles. After five activation cycles, no higher hydrogen content in the metal granulate than 50 atomic % was reached.

Another portion of the same metal granulate was filled into the pressure vessel 1 and baked out under vacuum in the temperature region between 120° and 140° C. for all of 5 hours. Then, the metal granulate was cooled down, and hydrogen was introduced into the pressure vessel until the pressure reached 50 bar, with the electrical heating switched in for 10 minutes. The courses of temperature and pressure are again illustrated in FIG. 6. The curves corresponding to this example are shown in broken lines. Fifteen hours after the switching of the heater, the metal granulate had a hydrogen content of 78±3 atomic %.

FIG. 7 shows in a tabulation of a few Fe-Ti-Mn metal granulates the temperatures that are at least necessary after pre-treatment (i.e., obtained after baking out under vacuum at 120° to 140° C. for 5 hours) for heating a part of the metal granulate according to the invention in order to initiate the activation process. These temperatures can be empirically determined, for example, by heating up slowly the metal granulates in a closed vessel remaining under hydrogen pressure. The temperature at which a taking up of hydrogen in the metal granulate begins in the vessel with decrease of the hydrogen pressure is the pressure given in the table of FIG. 7 as the activation temperature in °C. It has been found that the the value of high temperature produced by the point-shaped heat source affects the rate of self-activation of the metal granulate, with otherwise identical pre-treatment, as is shown by comparison of the results of Examples 1 and 2. On the other hand, how long the heat source initiating the activation process remains functioning is of little influence. Cutting the heating time in half from 20 to 10 minutes was of no effect on the final result defined by the hydrogen concentration in the metal granulate obtained after 15 hours; compare in this regard Examples 3 and 4. In the last column of the table given in FIG. 7 is the hydrogen concentration in the metal granulate obtained by heating once to the activation temperature.

Although the invention has been described with reference to particular examples, it will be understood that still other variations and modifications are possible within the inventive concept.

We claim:

1. A method of activating a metal granulate of a kind suitable for storage of hydrogen in a pressure vessel, comprising the steps of:
   admixing a minor amount of an easily activatable hydrogen-storing metal granulate to a mass of a metal granulate selected for its hydrogen storage capability rather than for its ease of activation;
   evacuating the resulting mixture of said granulates in a pressure vessel, and
   introducing hydrogen into said pressure vessel at a temperature at which said easily activatable metal granulate is capable of activation until the pressure in said vessel reaches a pressure of the order of magnitude of 50 bar,
   whereby the heat developed by activation of said easily activatable granulate builds up and initiates activation of all the granulate material of said mixture.

2. A method as defined in claim 1, in which said evacuation step includes baking out by heat gases that may be contained in said mixture of granulates.

3. A method as defined in claim 1, in which said minor amount of an easily activatable hydrogen-storing metal granulate does not exceed 5% by weight of the mixture of granulates.

4. A method as defined in claim 1, 2 or 3, in which said easily activatable metal granulate is a substance selected from the group consisting of iron- and titanium-containing alloys capable of storing hydrogen and activatable at a temperature less than 100° C. and LaNi$_5$.

5. A method of activating a metal granulate of a kind suitable for storage of hydrogen in a pressure vessel, comprising the steps of:
   placing a mass of a first metal granulate selected for its hydrogen storage capability rather than for its ease of activation in a pressure vessel;
   placing an amount of a second hydrogen-storing metal granulate that is easily activatable and which does not exceed in amount 5% by weight of said first granulate in said pressure vessel in contact with said mass of said second granulate;
   evacuating said pressure vessel while said granulates are located therein to remove gas therefrom, and
   introducing hydrogen into said pressure vessel at a temperature at which said first metal granulate is capable of activation until the pressure in said vessel reaches a pressure of the order of magnitude of 50 bar;
   whereby the heat developed by activation of said first granulate builds up and produces activation of said second granulate within said pressure vessel.

6. A method as defined in claim 5, in which said evacuation step includes baking out by heat gases that may be contained in said mixture of granulates.

7. A method as defined in claims 5 or 6, in which said easily activatable first metal granulate is a substance selected from the group consisting of iron- and titanium-containing alloys capable of storing hydrogen and activatable at a temperature less than 100° C. and LaNi$_5$.

8. A method of activating a metal granulate of a kind suitable for storage of hydrogen in a pressure vessel, comprising the steps of:
   introducing said metal granulate in a pressure vessel equipped with a heater capable of developing a temperature high enough for activation of said granulate in at least the immediate neighborhood of said heater, said granulate being placed in said pressure vessel in a mass allowing access of gas to the granules thereof, while maintaining the granules in sufficient contact with each other for transfer of heat through the mass;
   evacuating the granular mass in said pressure vessel, and then
   introducing hydrogen into said pressure vessel for a first period during which said heater is operated to produce said high temperature in its neighborhood in said granulate to activate a part of said granulate and continuing the introduction of hydrogen into said pressure vessel thereafter for activation of the remainder of said granulate by the heat developed by activation of the part of said granulate activated by said heater until the pressure reaches normal hydrogen-storage pressure in said vessel.

9. A method as defined in claim 8, in which the operation of said heater is electric.

10. A method as defined in claim 9, in which said heater is an electrical resistance heater.

11. A method as defined in claim 8, 9 or 10, in which the evacuation step includes the application of heat to bake out said granulate for removal of gases therefrom.

* * * * *